United States Patent
Xu

(10) Patent No.: US 6,925,830 B2
(45) Date of Patent: *Aug. 9, 2005

(54) WELL-WATER-TYPE LIQUID COOLING AND HEATING RESOURCE SYSTEM

(76) Inventor: Shengheng Xu, Beijing Splendid General Mechanical New Technology Corporation, No. 1 Building, Chedaogou, Zizhuyuan Road, Haidian District, Beijing 100089 (CN)

( * ) Notice: Subject to any disclaimer, the term of this patent is extended or adjusted under 35 U.S.C. 154(b) by 134 days.

This patent is subject to a terminal disclaimer.

(21) Appl. No.: 10/333,529
(22) PCT Filed: Jan. 18, 2001
(86) PCT No.: PCT/CN01/00063
§ 371 (c)(1),
(2), (4) Date: Jan. 21, 2003
(87) PCT Pub. No.: WO02/14754
PCT Pub. Date: Feb. 21, 2002

(65) Prior Publication Data
US 2004/0035552 A1 Feb. 26, 2004

(30) Foreign Application Priority Data
Aug. 18, 2000 (CN) ........................................ 00123494 A

(51) Int. Cl.$^7$ ............................ F25D 23/12; F25B 27/00
(52) U.S. Cl. ................... 62/260; 62/238.6; 62/238.7; 165/45
(58) Field of Search ................ 62/260, 238.6, 62/238.7; 165/45

(56) References Cited

U.S. PATENT DOCUMENTS

| | | | | |
|---|---|---|---|---|
| 4,718,248 A | * | 1/1988 | Fisher ........................ | 62/238.7 |
| 4,876,450 A | * | 10/1989 | Montgomery ................ | 250/261 |
| 5,183,100 A | * | 2/1993 | Harrell, Jr. .................... | 165/45 |
| 5,386,709 A | * | 2/1995 | Aaron ......................... | 62/199 |
| 5,388,419 A | * | 2/1995 | Kaye ........................... | 62/160 |
| 6,142,215 A | * | 11/2000 | Paulsen et al. ............... | 165/45 |

FOREIGN PATENT DOCUMENTS

| | | |
|---|---|---|
| CN | 1072010 A | 5/1993 |
| EP | 0 499 466 A2 | 8/1992 |
| FR | 2 750 480 | 1/1998 |

* cited by examiner

Primary Examiner—Cheryl Tyler
Assistant Examiner—Filip Zec
(74) Attorney, Agent, or Firm—Greer, Burns & Crain, Ltd.

(57) ABSTRACT

A well-water-type liquid cooling and heating resource system of the present invention, comprises a well, an energy lift device, a discharging pump and a suction pump sequentially connected by conduits. The well is separated into an upper portion and a lower portion by a baffle plate, and can supply constant temperature water at about 15° C. using as the low level cold and heat resources. The discharging tube and returning tube of the well is connected respectively with a liquid inlet tube and returning tube of the energy lift device. The suction pump is mounted at the lower portion of the well or on the baffle plate. The discharging tube of energy lift device, which is equipped with a discharge pump, is connected to a load such as an air conditioner. The load such as the air conditioner's returning tube is connected with the liquid inlet tube of a heat-exchanging pipeline coupling with the condenser of the energy lift device. The system costs lower and has no pollution.

9 Claims, 2 Drawing Sheets

WELL-WATER-TYPE LIQUID COOLING AND HEATING RESOURCE SYSTEM

FIELD OF THE INVENTION

The present invention relates to an energy resource system, in particular to a well-water-type liquid cooling and heating resource system.

BACKGROUND OF THE INVENTION

At present, common heat supply system employs coal, gas or oil as main energy resources. It is known that not only do coal, gas and oil have limited reserves, but produce massive ash, dust or exhaust gas while/after their combustion, not only polluting the environment, but transforming the atmosphere properties, thus resulting in greenhouse effect which warms the earth and then melts glaciers and rises the ocean level and etc. Energy used in conventional refrigerating systems is electricity, which costs higher, and an amount of it are also generated from burning fuels like coal, gas or oil etc, therefore the same problems caused by combusting those fuels to the environment happen here again. However, massive low level cold and heat resources are stored in underground water. A water-water heat pump system produced by CiAT Co., Ltd. uses well water as energy resource, however two wells are required for this system, one is for water supplying, and the other is for water returning. Consequently, the cost is high.

SUMMARY OF THE INVENTION

The object of the invention is to provide a well-water-type liquid cooling and heating resource system to overcome the above-mentioned shortages. The system has the merits of non-pollution and lower cost.

Well-water-type liquid cooling and heating resource system disclosed by the present invention comprises a well, a suction pump, an energy lift device and a discharge pump, wherein, there is only one well, in which a baffle plate is placed to separate the well into an upper portion and a lower portion. The suction pump is mounted at the lower portion or on the baffle plate. The energy lift device comprises a heating cycle and a heat-exchanging cycle consisting of a compressor, a condenser, a liquid reservoir, a drying filter, a restriction choke, an evaporator and a gas-liquid separator sequentially connected via conduits. In said heat-exchanging cycle, the discharging tube of the heat-exchanging pipeline coupling with said condenser is connected to a load via the liquid inlet tube and the discharge pump of the load. A returning tube of said load is connected to the liquid inlet tube of heat exchanging pipeline coupling with said condenser. The discharging tube of heat exchanging pipeline coupling with said evaporator is connected to the returning tube on the upper portion of well, and the discharging tube of said well is connected to the liquid inlet tube of the heat exchanging pipeline coupling with said evaporator via the suction pump situated at the lower portion of well or on the baffle plate.

The well-water-type liquid cooling and heating resource system disclosed by the present invention provides a further improvement, in that it also comprises two two-position-four-way valves, the discharging tube of the heat-exchanging pipeline coupling with said condenser is connected to the first joint of the first two-position-four-way valve and its liquid inlet tube is connected with the first joint of the second two-position-four-way valve. The liquid inlet tube of the load is connected to the second joint of the first two-position-four-way valve, and the returning tube of the load is connected to the fourth joint of the second two-position-four-way valve. The discharging tube of the heat-exchanging pipeline coupling with said evaporator is connected to a third joint of the said first two-position-four-way valve, and the liquid inlet tube of the heat-exchanging pipeline coupling with said evaporator is connected with the third joint of the second two-position-four-way valve. The returning tube of said well is connected to the fourth joint of the first two-position-four-way valve, and the discharging tube of said well is connected to the second joint of the second two-position-four-way valve.

The well-water-type liquid cooling and heating resource system disclosed by the present invention provides another improvement, in that a working medium R 22 is filled in said heating cycle.

The well-water-type liquid cooling and heating resource system disclosed by the present invention provides also another improvement, in that an antifreeze solution is filled in said heat-exchanging cycle.

The well-water-type liquid cooling and heating resource system disclosed by the present invention, wherein a heat exchanger is provided between said well and the energy lift device.

The advantage of this well-water-type liquid cooling and heating resource system of the present invention is by using massive low level heat resources restored in underground water as energy to provide cool or heat to the place where needs cooling or heating, for example, this system can be used for winter heating and summer cooling, generating no toxic and harmful materials during the operation, and resulting in no pollution. In addition, one well provided by this system substitutes the functions produced by two wells in terms of supplying and returning water, thereby the investment of the well is lowered. Furthermore, when water returning is obstructed, the water supplying can be conducted by the suction pump located on the baffle plate in the well, sucking water from the upper portion and returning at the lower portion of the well, therefore enabling the returning water under compression.

DETAILED DESCRIPTION OF THE PREFERRED EMBODIMENTS

Figure 1:
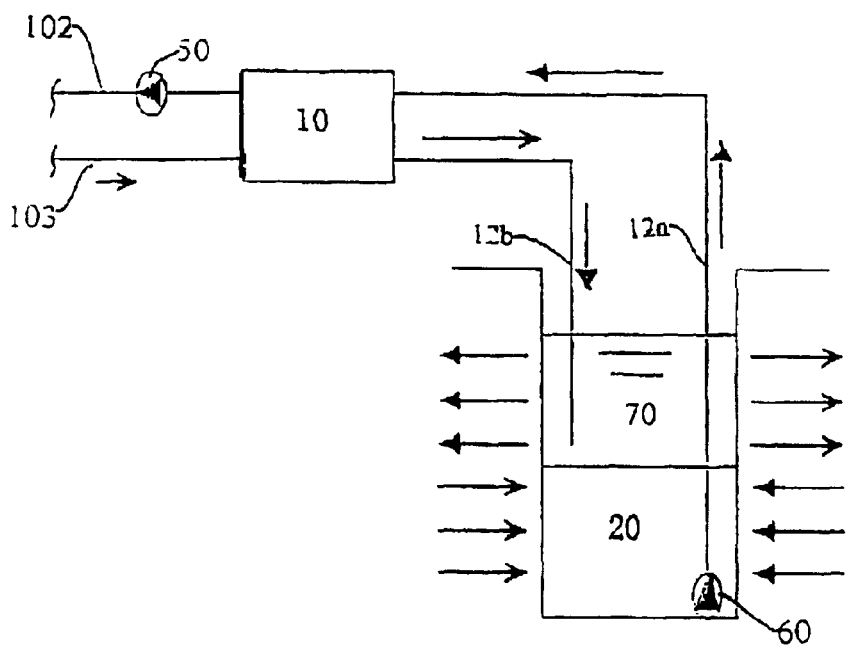
FIG. 1 is one of the schematics of well-water-type liquid cooling and heating resource system of the present invention.

Referring to the drawings, the well-water-type liquid cooling and heating resource system of the present invention shall be further described as follows.

As shown in FIG. 1, the invention's well-water-type liquid cooling and heating resource system comprises, a well 20, an energy lift device 10, a discharge pump 50 and a suction pump 60 connected together by the conduits. Well 20 enables to provide constant-temperature well-water from low level cold and heat resources at about 15° C., the discharging tube 12a, returning tube 12b is connected respectively to the liquid inlet tube and the returning tube of energy lift device. The suction pump 60 is mounted on the lower portion of the well 20. The discharging tube 102 of energy lift device 10 is connected to an air conditioner (not shown). The discharge pump 50 is mounted on the discharging tube 102, and the returning tube 103 of the air conditioner is connected to liquid inlet tube 2b (FIG. 3) of heat exchanging pipeline 30 coupling with condenser 2 of energy lift device 10.

Figure 2:
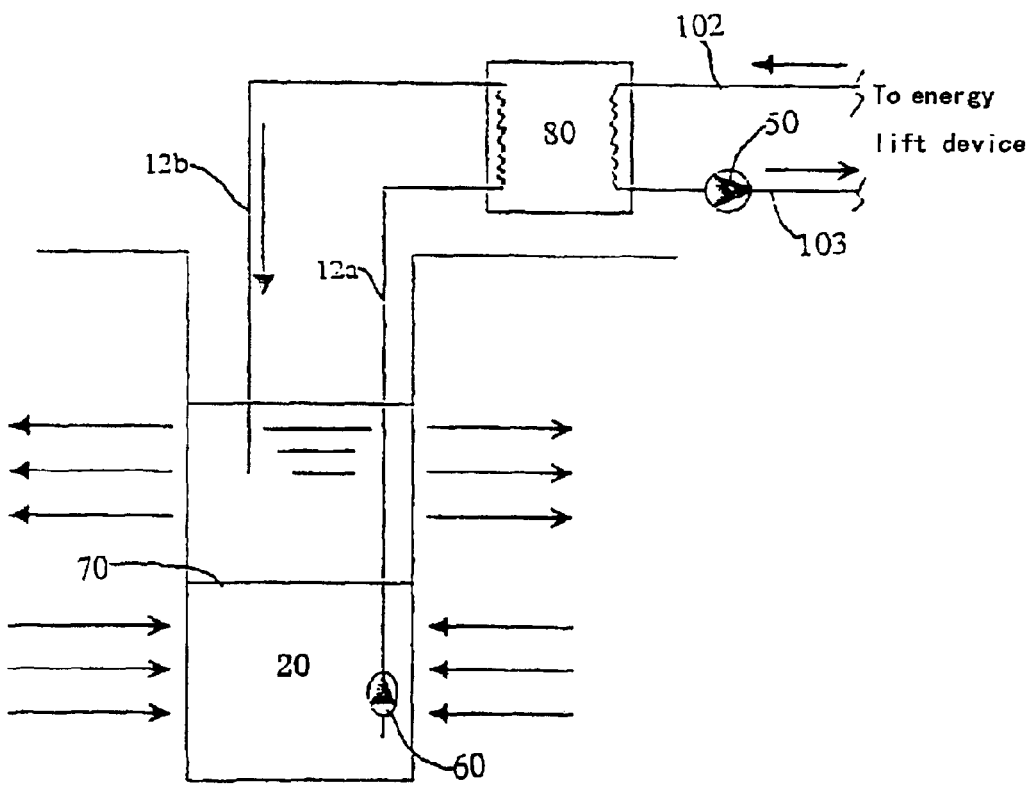
FIG. 2 is another schematic of well-water-type liquid cooling and heating resource system of the present invention.

As shown in FIG. 2, the invention's well-water-type liquid cooling and heating resource system of the present invention provides a heat exchanger 80 between said well and said energy lift device in the system as shown in FIG. 1.

Figure 3:
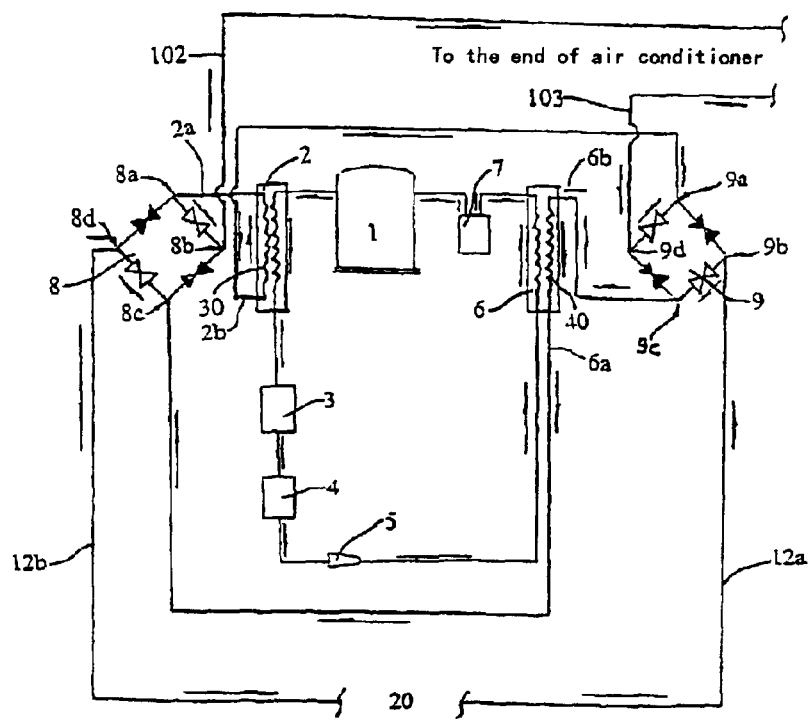
FIG. 3 is the schematic showing the working principle of winter-heating process of the energy lift device in well-water-type liquid cooling and heating resource system of the present invention.

FIG. 3 is a schematic of working principle of winter-heating process of the energy lift device 10 of the system. The energy lift device 10 comprises a heating cycle and a heat-exchanging cycle, wherein the heating cycle comprises a compressor 1, a condenser 2, a liquid reservoir 3, a drying filter 4, a restriction choke 5, an evaporator 6 and a gas-liquid separator 7 sequentially connected via conduits. The heating cycle is the same as the heating (cooling) cycle in conventional air conditioner or refrigerator. A working medium R 22 used for heat circulation is filled in the heating cycle.

In the heat-exchanging cycle, two two-position-four-way valves are provided, i.e. the first two-position-four-way valve 8 and the second two-position four-way valve 9. Wherein the discharging tube 2a of heat exchanging pipeline 30 coupling with condenser 2 is connected to the first joint 8a of the first two-position-four-way valve 8, and its liquid inlet tube 2b is connected with the first joint 9a of the second two-position four-way valve 9. The liquid inlet tube 102 of the air conditioner is connected to the second joint 8a of the first two-position-four-way valve 8, and its discharging tube 103 is connected to the fourth joint 9d of the second two-position-four-way valve 9. The discharging tube 6a of heat exchanging pipeline 40 coupling with the evaporator 6 is connected to the third joint 8c of the first two-position-four-way valve 8, and its liquid inlet tube 6b connects with the third joint 9c of the second two-position-four-way valve 9. The returning tube 12b of well 20 is connected to the fourth joint 8d of the first two-position-four-way valve 8, and its discharging tube 12a is connected with the second joint 9b of the second two-position four-way valve 9. Working media like the water or antifreeze solution are filled in the heat exchanging cycle. When the liquid cooling and heating resource system using well water as energy resource works for air conditioner, the antifreeze solution is filled in the heat-exchanging cycle. If the system is solely used for supplying hot water, water is used as the working medium in heat-exchanging cycle.

The winter-heating working process of said energy lift device 10 is described as follows: the liquid working medium in heat-exchanging cycle pipelines absorbs low level thermal energy in well 20 and is supplied by suction pump, going through the second two-position-four-way valve 9 and the liquid inlet tube 6b, to heat-exchanging pipeline 40 coupling with evaporator 6. The heat-exchange is performed in evaporator 6, in order to transfer heat onto evaporator 6. After heat exchanging, the liquid returns to well 20 via the discharging tube 6a, the first two-position-four-way valve 8, and the returning tube 12b of well 20. In the meanwhile, working medium R22 in evaporator 6 is transformed into gas at low temperature and low pressure, then delivered into gas-liquid separator 7 by evaporator 6. And after gas and liquid are separated in gas-liquid separator 7, the gas is transferred into compressor 1. The gas at low temperature and low pressure is transformed into the gas at high temperature and high pressure by the compressor and is delivered to condenser 2. In condenser 2, the gas at high temperature and high pressure discharged from compressor 1 exchanges the heat to the working medium in heat-exchanging pipeline 30 coupling with condenser 2. After heat exchanging, the heated liquid working medium flows through the discharging tube 2a, the first two-position-four-way valve 8, the discharge pump 50 and the liquid inlet tube 103 of the air conditioner into the air conditioner in order to raise the air temperature of the room. After the air conditioner emits heat, the liquid working medium returns to the heat-exchanging cycle 30 coupling with the condenser 2 via the returning tube 103 of the air conditioner, the second two-position-four-way valve 9, the liquid inlet tube 2b, and the working cycle is completed.

The purpose of providing two above-mentioned two-position-four-way valves is to enable the well-water-type liquid cooling and heating resource system of the present invention to be adapted in winter and summer. If the system is only used for winter heating, the two-position-four-way valves may not be equipped.

Figure 4:
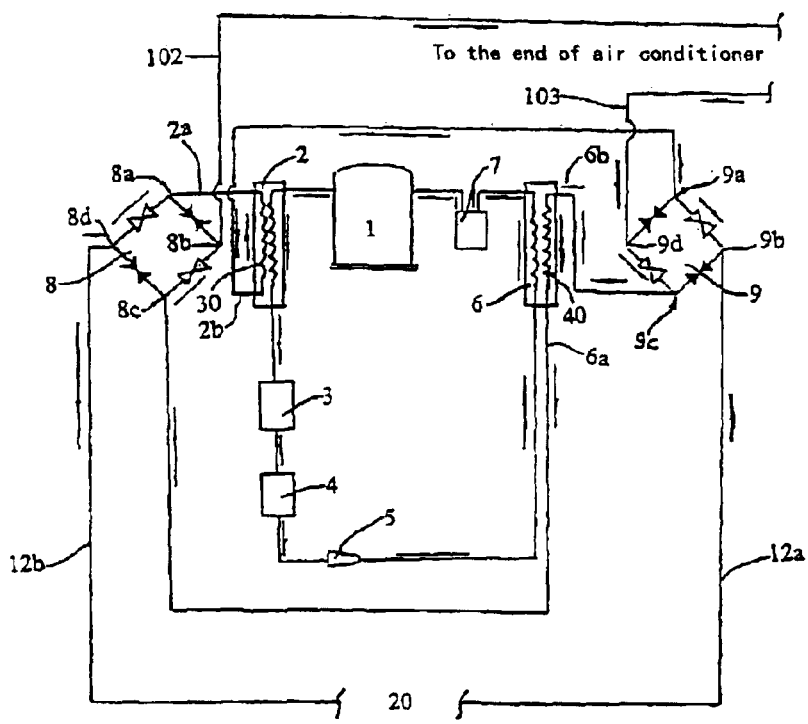
FIG. 4 is the schematic showing the working principle of summer-cooling process of the energy lift device in well-water-type liquid cooling and heating resource system of the present invention.

FIG. 4 is a the schematic showing the working principle of summer-cooling process of the energy lift device 10 of the system. In the figure, directions of the first two-position-four-way valve 8 and the second two-position-four-way valve 9 are changed over. Wherein, the first two-position-four-way valve 8 is connected to the discharging tube 6a of heat-exchanging pipeline 40 coupling with the evaporator 6 and the liquid inlet tube 102 of the air conditioner, and connected to the discharging tube 2a of heat-exchanging pipeline 30 coupling with the condenser 2 and the returning tube 12b of well 20. At the same time, the second two-position-four-way valve 9 is connected to the liquid inlet tube 6b of heat-exchanging pipeline 40 coupling with the evaporator 6 and the returning tube 103 of the air conditioner, and connected with the liquid inlet tube 2b of heat exchanging pipeline 30 coupling with the condenser 2 and the discharging tube 12a of well 20, enabling the low temperature working medium in the heat-exchanging pipeline 40 coupling with the evaporator 6 to connect with the air conditioner. Thereby supplying cool air to the room is completed.

Obviously, the well-water-type liquid cooling and heating resource system of the present invention can be directly applied for supplying hot water to the user as well. In this case, what requires are to mount a valve on the liquid inlet tube 102 of the air conditioner, and to connect returning tube 103 of the air conditioner to the running water tube.

As shown in FIGS. 1–2, the suction pump 60 is generally located on the lower portion of well 20. In certain case, as the returning water is obstructed, the suction pump 60 may be mounted on the baffle plate 70, water is sucked from the upper portion of the well and returned to the lower portion, and this returning water returns with pressure.

For winter heating, the input temperature of liquid entering the energy lift device 10 is e.g. about 15° C., and the output temperature of liquid from the energy lift device 10 can reach up to around 50° C. After going through a load, e.g. an air conditioner, the liquid temperature in the returning tube 103 of the air conditioner is about 45° C., and the liquid temperature in returning tube 12b in well is about 10° C.

For summer cooling, for example, the input temperature of liquid entering energy lift device 10 is likewise about 15° C., the output temperature of liquid from energy lift device 10 is around 7° C. After passing through a load, e.g. an air conditioner, the liquid temperature in the returning tube 103 of the air conditioner is about 12° C., and the liquid temperature in returning tube 12b in well is about 20° C.

Industrial Applications

By using massive low level heat resources restored in underground water as energy, the system in this invention can be used, for example, for winter heating and summer cooling, generating no toxic and harmful materials during the operation, and resulting in no pollution. Furthermore, this system provides one well to substitute the functions of two wells in terms of sucking and returning water, and massive ready-made components have been employed. Therefore investment is low, and it is easy to be introduced to various applications.

What is claimed is:

1. A well-water-type liquid cooling and heating resource system, comprises a well, wherein further comprises:
    a suction pump, an energy lift device and a discharging pump,
    wherein, well is one, and in which a baffle plate is provided to separate well into the upper and lower portions,
    a suction pump is mounted at the lower portion of well or on baffle plate,
    an energy lift device comprises: a heating cycle and a heat-exchanging cycle consisting of a compressor, a condenser, a liquid reservoir, a drying filter, a restriction choke, an evaporator and a gas-liquid separator sequentially connected via conduits,
    the discharging tube of heat exchanging pipeline coupling with said condenser in said heat-exchanging cycle connects to a load via a liquid inlet tube and a discharge pump of the load;
    the returning tube of said load connects to the liquid inlet tube of heat exchanging pipeline coupling with said condenser;
    the discharging tube of heat-exchanging pipeline coupling with said evaporator connects with a returning tube on the upper portion of said well;
    the discharging tube of said well connects to the liquid inlet tube of heat exchanging pipeline coupling with said evaporator via the suction pump on the lower portion of well or the baffle plate.

2. The well-water-type liquid cooling and heating resource system according to claim 1, wherein further comprises two two-position-four-way valves, the discharging tube of heat exchanging pipeline coupling with said condenser connects with the first joint of the first two-position-four-way valve, and its liquid inlet tube connects to the first joint of the second two-position-four-way valve; the liquid inlet tube of the load connects to the second joint of the first two-position-four-way valve, and the returning tube of the load connects to the fourth joint of the second two-position-four-way valve; the discharging tube of heat exchanging pipeline coupling with said evaporator connects with the third joint of the said first two-position-four-way valve, and its liquid inlet tube connects to the third joint of the second two-position four-way valve; the returning tube on the upper portion of said well connects with the fourth joint of the first two-position-four-way valve and its discharging tube connects to the second joint of the second two-position-four-way valve.

3. The well-water-type liquid cooling and heating resource system according to claim 1, wherein said heating cycle is filled with working medium R 22.

4. The well-water-type liquid cooling and heating resource system according to claim 3, wherein an antifreeze solution is filled in said heat-exchanging cycle.

5. The well-water-type liquid cooling and heating resource system according to claim 1, wherein a heat exchanger is provided between said well and said energy lift device.

6. The well-water-type liquid cooling and heating resource system according to claim 3, wherein the heat exchanger is provided between said well and said energy lift device.

7. The well-water-type liquid cooling and heating resource system according to claim 2, wherein said heating cycle is filled with working medium R 22.

8. The well-water-type liquid cooling and heating resource system according to claim 2, wherein a heat exchanger is provided between said well and said energy lift device.

9. The well-water-type liquid cooling and heating resource system according to claim 4, wherein a heat exchanger is provided between said well and said energy lift device.

* * * * *